United States Patent [19]

Teng et al.

[11] 3,883,666

[45] May 13, 1975

[54] CHEWING GUM BASE AND CHEWING GUM MADE THEREFROM

[75] Inventors: James Teng, St. Louis County; Marcella C. Stubits, St. Louis, both of Mo.

[73] Assignee: Anheuser-Busch, Incorporated, St. Louis, Mo.

[22] Filed: Mar. 11, 1974

[21] Appl. No.: 450,052

[52] U.S. Cl. .................................................. 426/3
[51] Int. Cl. ........................... A23g 3/00; A23g 3/30
[58] Field of Search .................................. 426/3–6; 260/233.5

[56] References Cited
UNITED STATES PATENTS

| | | | |
|---|---|---|---|
| 1,651,366 | 12/1927 | Berthon | 260/233.5 |
| 2,868,780 | 1/1959 | Minkema | 260/233.5 |
| 3,396,038 | 8/1968 | Knapp | 426/6 |
| 3,666,492 | 5/1972 | Teng | 426/3 |

*Primary Examiner*—A. Louis Monacell
*Assistant Examiner*—J. M. Hunter
*Attorney, Agent, or Firm*—Gravely, Lieder & Woodruff

[57] ABSTRACT

A chewing gum and a chewing gum base made from a hydroxypropyl starch acetate. The starch has a degree of molecular substitution of hydroxypropyl radicals of about 3 to about 6 and a degree of substitution of acetyl groups of about 1.0 to about 2.5. The gum base is water insoluble and is a solid gum of good elasticity.

5 Claims, No Drawings

CHEWING GUM BASE AND CHEWING GUM MADE THEREFROM

BACKGROUND OF THE INVENTION

Chewing gum consists of two major portions, masticatory and non-masticatory. The masticatory portion is usually called chewing gum base, and often includes filler, while the non-masticatory portion consists mostly of sweetening and flavoring ingredients.

For a long time, natural water-insoluble gums of vegetable origin, i.e., chicle, were used for the major portion of chewing gum base. Unfortunately, the natural gums are subject to substantial price fluctuations as well as unpredictability of supply. Because of these reasons, manufacturers have in recent years tried with varying degrees of success to duplicate the desirable properties of natural gum by means of synthetic resins, rubber and other polymers.

U.S. Pat. No. 3,396,038 and patents referred to therein give representative showings of the art with respect to synthetic resin bases, particularly those of polyvinyl acetate derivation. The prior art also includes gum bases such as gluten (U.S. Pat. Nos. 2,586,675 and 1,700,387), prolamine (U.S. Pat. No. 2,469,861), and Zein (U.S. Pat. No. 2,489,147).

In U.S. Pat. No. 3,666,492 issued May 20, 1972 to Teng and Rha there is disclosed a fatty acid ester of starch, as a chewing gum base. The invention of U.S. Pat. No. 3,666,492 involves a saturated fatty acid having from 8-14 carbons atoms (specifically starch laurate), and a degree of substitution of above 2.

Accordingly, one of the principal objects of the present invention is to provide a chewing gum made from a hydroxypropyl starch acetate which meets the industry criteria for functional and esthetic qualities.

A further object is to provide a synthetic chewing gum base made from hydroxypropyl starch acetate having a degree of molecular substitution of hydroxypropyl groups of about 3 to about 6.0 and a degree of substitution of acetate groups of about 1.0 to about 2.5.

A further object is to provide a chewing gum which is smooth, cohesive, free from tackiness, and resilient after mastication. Still a further object is to provide a chewing gum base which is of wholesome appearance and can be simply and economically formulated and processed into chewing gum.

These and other objects and advantages will become apparent hereinafter.

SUMMARY OF THE INVENTION

This invention comprises a superior chewing gum in which the gum base is made from starch derivatives, more specifically, hydroxypropyl starch acetate. This invention also relates to a process for preparing such gum and base as hereinafter described and claimed.

DETAILED DESCRIPTION

Preparation of Hydroxypropyl Starch 40 grams of pearl starch was dispersed in 450 ml. of toluene, and 16 ml. of 25% aqueous sodium hydroxide added with rapid agitation. This mixture was transferred to a Parr pressure vessel, 200 ml. propylene oxide added, the vessel cooled, and purged with nitrogen three times at 100 psi. The mixture was stirred at 600 rpm for 2 minutes during each purge. The vessel was heated slowly from 25° to 100°C. over a period of 4 hours, then held at 100°C. for 2 hours, cooled to 30°C. and vented. The hydroxypropyl starch precipitated as a soft stringy white gum upon addition of 100 ml. water to the toluene mixture. The toluene was decanted, and 800 ml. cold water was added to the gum, which dissolved upon stirring. The aqueous solution was neutralized with 20% $H_3PO_4$, then slowly heated with constant stirring. The hydroxypropyl starch precipitated as a sticky gum between 35° and 40°C. The warm water was decanted, the gum redissolved in cold water and reprecipitated two times, then dried at 70°C. for 24 hours. 84 grams of tough gummy material was recovered, the M.S. was 4.4.

Preparation of Hydroxypropyl Starch Acetate 20 grams of the foregoing material was dispersed in 200 ml. toluene. 30 ml. acetic anhydride was added and the mixture stirred for 10 minutes; 2.5 ml. HCl was then added and the reaction mixture stirred for 2 hours at 50° to 55°C. 200 ml. water was added to the clear slightly viscous solution, the mixture agitated vigorously for 2 minutes, allowed to stand 5 minutes, and the water layer decanted. After 3 water washes, the toluene layer was washed with 200 ml. 5% sodium bicarbonate solution, plus an additional water wash. Hydroxypropyl starch acetate was then precipitated from the toluene by the addition of 300 ml. hexane. The gum was further purified by dissolving in 200 ml. chloroform, precipitating with 300 ml. hexane, and drying in a vacuum oven at 50°C. overnight. The D.S. of the hydroxypropyl starch acetate gum was 1.3.

Preparation of Hydroxypropyl Starch Acetate from Waxy Starch

The foregoing procedure for the production of hydroxypropyl starch and hydroxypropyl starch acetate was repeated using waxy unmodified starch as the starting material.

This resulted in the production of hydroxypropyl waxy starch acetate of M.S. 4.4 and D.S. of 1.3.

CHEWING GUM BASE

One step process 80 grams of pearl starch was dispersed in 900 ml. toluene, and 32 ml. of 25% aqueous sodium hydroxide added with rapid agitation. This mixture was transferred to a Parr pressure vessel, 400 ml. propylene oxide added, the vessel sealed, and purged with nitrogen three times at 100 psi. The vessel was slowly heated from 25°C. to 110°C. over a period of 2 hours, held at 110°C. for 1 hour, cooled to 50°C. and vented.

Acetic anhydride (500 ml.) was added, and the mixture stirred at 50°–55°C. for 2 hours. The mixture was transferred to a 4 liter beaker, 2 liters water added, and stirred rapidly for 30 minutes. The toluene-water emulsion was allowed to separate, and the water layer drawn off. Water (2 liters at 4°C.) was again added to the toluene fraction, stirred rapidly, and the emulsion neutralized with 10% aqueous sodium hydroxide. The mixture was again allowed to separate and the water layer drawn off. The water wash was repeated four times. The gum was precipitated with hexane (1,000 ml.) and vacuum dried at 50°C.

The product of this one step process has a degree of molecular substitution of hydroxypropyl groups of about 3 to 5.6 and a degree of substitution of acetate groups of about 1 to 1.5.

When making the hydroxypropyl starch of this invention the preferred solvent is toluene. There is no need for catalyst when the hydroxypropyl starch acetate is prepared as described in the one step process.

When hexane is used as the solvent and trimethylamine as a catalyst, it is difficult to achieve a uniform product by this method, since the gummy starch acetate agglomerates in hexane at a low degree of substitution, and uniform mixing became impossible in an early stage of the reaction. When toluene is used as the solvent, the final reaction mixture is clear, uniform, and only slighly viscous. Both trimethylamine and pyridine catalysts are difficult to remove from the final acetate gum; trace odor is detected after several purifications. Hydroxypropyl starch acetate gum, synthesized in toluene using HCl as a catalyst or without catalyst, is completely odorless and bland in taste. The gum is pearly white and pleasing in appearance; it is smooth, cohesive, free from tackiness and resilient after mastication.

The gum produced from waxy maize is slightly firmer and less elastic than that made from pearl starch. Chewing properties of both gums are superior to samples of gum base from a commercial source.

The hydroxypropyl starch acetate prepared as herein described has good gummy, cohesive masticatory properties. When this starch derivative is formulated into a chewing gum base, the resultant product is similar to or superior to both natural and synthetic chewing gum based products as shown by the results of the chew test performed in accordance with the method generally accepted in the trade.

The hydroxypropyl starch acetate gum is compatible with synthetic and natural gum base, flavoring agents, plasticizer fillers and other items regularly used in chewing gums.

EXAMPLE NO. 1

This example shows the preparation of chewing gum from hydroxypropyl starch acetate made of waxy starch. The starch acetate is prepared as hereinbefore set forth and has an M.S. of 4.5 and a D.S. of 1.6.

| Base (hydroxypropyl starch acetate from waxy starch) | 17.3% |
|---|---|
| Corn Syrup 43° Be | 61.6% |
| Powdered sugar | 20.7% |
| Water | 0.1% |
| Glycerin | 0.1% |
| Peppermint oil | 0.2% |

The base, water, glycerin, corn syrup and peppermint oil were blended into a tacky mass at 60°C. Powdered sugar was added; the mixture was heated to 80°C., blended until smooth, then divided into individual gum balls (3 grams each) while still warm. This material became hard and brittle upon cooling. The chewing gum ball broke easily upon chewing, softened and had good chewing properties.

EXAMPLE NO. 2

This example shows the preparation of chewing gum from hydroxypropyl starch acetate made of pearl starch. The hydroxypropyl starch acetate is made as hereinbefore set forth and has an M.S. of 4.4 and a D.S. of 1.3.

| Base (hydroxypropyl starch acetate) | 18.6 |
|---|---|
| Corn Syrup 43° Be | 80.3 |
| Water | 0.3 |
| Glycerin | 0.3 |
| Spearmint oil | 0.5 |

The foregoing mixture was blended at 55°C., and divided into 3 gram balls while warm. Individual pieces were dusted with powdered sugar. This blend remained flexible upon standing, and was easily rolled into stick form. Firmness and flexibility were similar to commercial stick gum both before and after chewing.

The Chewing Test Rating for both examples is shown on the following Table and compared to commercial gum.

TABLE NO. I

GUM CHEWING TEST

| Sample No. | 1 | 2 | 3 |
|---|---|---|---|
| | Waxy HP Starch Acetate | Commercial Gum, Sticks | Pearl HP Starch Acetate |
| | INITIAL STAGE | | |
| Stiffness | 16 | 13 | 8 |
| Adhesion | 6 | 8 | 10 |
| | INTERMEDIATE STAGE | | |
| Consistency | 10 | 10 | 8 |
| | FINAL STAGE (Base only) | | |
| Smoothness | 10 | 8 | 10 |
| Stiffness | 12 | 8 | 12 |
| Lift | 12 | 8 | 10 |
| Freeness to teeth | 10 | 10 | 10 |
| Freeness to lips | 10 | 10 | 10 |
| Taste | 10 | 10 | 10 |

The numeral 10 is optimum in the foregoing Table and both above and below 10 are less than optimum.

TABLE NO. II

NUMERICAL EVALUATION

| | | 0 | 10 | 20 |
|---|---|---|---|---|
| Initial | Flexibility | Brittle | Good | Floppy |
| | Stiffness | Raglike | Medium | Leathery |
| | Adhesion | Crumbly | Gummy | Tacky |
| Intermediate | Firmness of low point | Sloppy | Firm as final | |
| Final | Smoothness | Rough | Silky | Too slippery |
| | Stiffness | Soupy | Medium | Leathery |
| | Lift | Plastic | Round | Rubbery |
| | Freeness | Tacky | Free | |
| | Cohesion | Waxy | Slight wet paper | Too wet papery |
| | Stretch | Stringy | Full and wide | None (tears) |
| | Taste | Objectionable | None | |

The term 'medium' as used above defines a chew which is between softness and firmness.

TERMINOLOGY

Initial Stage:
Consists of the first few bites before the gum is hydrated or warmed.
Flexibility describes the condition of the piece even before chewing and is self-explanatory.
Stiffness is the opposition offered to the teeth when bitten.
Adhesion when too high becomes tacky due to glucose rather than base and its low extreme is crumbly.

Intermediate Stage:
Is a temporary softness due to hydration before all sugar is removed. This stage disappears as sugar is removed and the cud approaches straight base.
Firmness at low point is the consistency of the base at maximum softness as compared to its consistency at the final stage of the chew.
Duration is self-explanatory.

Final Stage:
Is attained when sugar and glucose are removed.
Smoothness describes the feel of the cud (when flattened against the roof of the mouth) to the tongue.
Slippery or slimy is excessive smoothness. A satiny or sily feeling is desirable.
Stiffness is the opposition of the cud to the teeth at the start of the bite.
Lift is the capacity to obliterate or round out indentations in a cud caused by the tooth. It may be described as resilience or spring-back. The absence of lift is plasticity or waxiness.
Freeness is the absence of adhesion to the teeth.
Cohesion is the opposition offered to the teeth at the end of the bite as compared to the start. (The increment of increase in stiffness from the starch of the bite to the end.) It is desirable to have the increase in stiffness graduate throughout the bite rather than a sharp increase at the end of the bite.
Stretch is that property which enables a sample to be pulled out in a ribbon to arm's length.
Taste-A measure of the desirable lack of this quality in the base.

The chewing gum made from this starch derivative has superior characteristics compared with many of the commercial chewing gums in the sense that it is smoother, more cohesive, completely free from tackiness and resilient upon mastication. It is also less tacky or adhesive when discarded after chewing. The appearance of the hydroxypropyl starch acetate chewing gum is more attractive because of its pearly white color and sheen than is ordinary chewing gum, which has a dull greyish color or is tinted.

Generally, commercial chewing gum base is comprised of a complex blend of several ingredients. Sometimes mixtures of more than one ingredient from the following categories are used.

A. Water-insoluble, natural, chewable, plastic gum as chicle or substitutes including jelutong, gutta Hang Kang, rubber, etc.

B. Synthetic water-insoluble chewable, plastic polymers such as butadiene-styrene rubber, isobutylene-isoprene copolymer, polyisobutylene, polyvinyl acetate, etc.

C. Plasticizers or softening agents such as glycerine, glycerol ester of gum rosin, pentaerythritol ester of wood rosin, methyl acetyl ricinoleate, acetyl tributyl citrate, propylene glycol, hydrogenated oil, lecithin, waxes and the like.

D. Cohering or adhering agents such as natural or synthetic terpene resins.

E. Filling agents such as infusorial earth or calcium carbonate.

F. Preservatives or other miscellaneous additives such as antioxidants or reaction controlling agents and the like.

Hydroxypropyl starch acetate is capable of being compounded into a good chewing gum with the addition of only one or two ingredients, mainly sweeteners. The hydroxypropyl starch acetate of this invention is a satisfactory chewing gum base alone as demonstrated by the preceeding examples.

This invention is intended to cover all changes and modifications of the examples of the invention herein chosen for purposes of the disclosure which do not constitute departures from the spirit and scope of the invention.

What is claimed is:

1. A chewing gum comprising as an essential ingredient a chewing gum base of a hydroxypropyl starch acetate.

2. The product of claim 1 wherein the hydroxypropyl starch acetate has a degree of molecular substitution of hydroxypropyl groups of about 3 to about 6.

3. The product of claim 1 wherein the hydroxypropyl starch acetate has a degree of substitution of acetate groups of about 1.0 to about 2.5.

4. The product of claim 1 having a degree of molecular substitution of hydroxypropyl groups of about 4.4 to about 4.5 and a degree of substitution of acetate groups of about 1.3 to about 1.65.

5. A hydroxypropyl starch acetate having elastic properties and being water insoluble, said starch having a degree of molecular substitution of hydroxypropyl groups of about 3 to about 6 and a degree of substitution of acetate groups of about 1 to about 2.5.

* * * * *